US012669217B2

(12) United States Patent
Miadowitz

(10) Patent No.: US 12,669,217 B2
(45) Date of Patent: Jun. 30, 2026

(54) LINER FOR A PRESSURE VESSEL, AND PRESSURE VESSEL

(71) Applicant: Bayerische Motoren Werke Aktiengesellschaft, Munich (DE)

(72) Inventor: Thomas Miadowitz, Ergolding (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/839,758

(22) PCT Filed: Apr. 4, 2023

(86) PCT No.: PCT/EP2023/058827
§ 371 (c)(1),
(2) Date: Aug. 20, 2024

(87) PCT Pub. No.: WO2023/208544
PCT Pub. Date: Nov. 2, 2023

(65) Prior Publication Data

US 2025/0155079 A1 May 15, 2025

(30) Foreign Application Priority Data

Apr. 27, 2022 (DE) ..................... 10 2022 110 152.5

(51) Int. Cl.
*F17C 1/06* (2006.01)

(52) U.S. Cl.
CPC ........ *F17C 1/06* (2013.01); *F17C 2201/0109* (2013.01); *F17C 2203/012* (2013.01);
(Continued)

(58) Field of Classification Search
CPC ................ F17C 1/06; F17C 2201/0109; F17C 2203/012; F17C 2203/0604; F17C 2203/0619; F17C 2203/066; F17C 2203/0673; F17C 2221/012; F17C 2270/0168
See application file for complete search history.

(56) References Cited

U.S. PATENT DOCUMENTS 4,022,343 A * 5/1977 Richardson ............ B65D 59/06
206/521
5,659,941 A 8/1997 Huvey
(Continued)

FOREIGN PATENT DOCUMENTS

CN 207621668 U 7/2018
DE 10 2017 206 521 A1 10/2018
(Continued)

OTHER PUBLICATIONS

International Search Report (PCT/ISA/210) issued in PCT Application No. PCT/EP2023/058827 dated Jul. 13, 2023 with English translation (5 pages).
(Continued)

*Primary Examiner* — Shawn M Braden
(74) *Attorney, Agent, or Firm* — Crowell & Moring LLP

(57) ABSTRACT

A liner for a pressure vessel has a gas-tight body made from a polymer material. The gas-tight body has an outer surface in which depressions are formed, and a fiber reinforcement is arranged in the depressions. A pressure vessel with a liner of this type is also described.

16 Claims, 2 Drawing Sheets

(52) U.S. Cl.
CPC ................. *F17C 2203/0604* (2013.01); *F17C 2203/0619* (2013.01); *F17C 2203/066* (2013.01); *F17C 2203/0673* (2013.01); *F17C 2221/012* (2013.01); *F17C 2270/0168* (2013.01)

(56) References Cited

U.S. PATENT DOCUMENTS

| | | | | |
|---|---|---|---|---|
| 10,704,738 | B2 * | 7/2020 | Iwano | F17C 1/16 |
| 2017/0254477 | A1 * | 9/2017 | Schimenti | F17C 13/06 |
| 2022/0299160 | A1 * | 9/2022 | Tarnowski | F17C 1/06 |
| 2023/0081419 | A1 * | 3/2023 | VanOyen | F17C 1/06<br>220/581 |

FOREIGN PATENT DOCUMENTS

| | | | |
|---|---|---|---|
| EP | 3 267 091 | A1 | 1/2018 |
| FR | 2 781 555 | A1 | 1/2000 |
| WO | WO 00/66939 | A1 | 11/2000 |

OTHER PUBLICATIONS

German-language Written Opinion (PCT/ISA/237) issued in PCT Application No. PCT/EP2023/058827 dated Jul. 13, 2023 with English translation (7 pages).
German-language Search Report issued in German Application No. 10 2022 110 152.5 dated Feb. 3, 2023 with partial English translation (10 pages).

* cited by examiner

A-A

LINER FOR A PRESSURE VESSEL, AND PRESSURE VESSEL

BACKGROUND AND SUMMARY

The invention relates to a liner for a pressure vessel, especially a hydrogen tank, and to a pressure vessel.

Hydrogen tanks that are used in vehicles, especially motor vehicles, must firstly be light in order not to unnecessarily increase the vehicle weight and must secondly be very stable in order to withstand the necessary high pressures for storage of the hydrogen. Moreover, the tanks must not fail critically in the event of a vehicle crash.

Different tank systems are being developed for storage of hydrogen. In addition to steel tanks, fiber-reinforced pressure vessels may be used, as known, for example, from document DE 10 2017 206 521 A1. Such pressure vessels typically comprise a liner and a fiber composite body surrounding the liner. The liner may have been produced from a metal or from plastic. The hydrogen is stored in the liner, and the liner is generally responsible for the integrity of the pressure vessel and acts as a barrier layer for the hydrogen. If the liner has been produced from plastic, it is usually a cylindrical hollow body bounded at each of its two ends by a cap, so-called bosses. The assembly of liner and caps is then surrounded by the fiber composite body.

The mechanical strength of fiber-reinforced pressure vessels is typically provided by the fiber composite body that surrounds the liner. Hydrogen is stored at very high pressure. In order that fiber-reinforced tank systems meet the pressure demands, the fibers have to be laid in the direction of load. Since there is a hydrostatic pressure in the tank system, it is necessary to provide fiber reinforcements in virtually every orientation (spatial direction).

One means of producing a tank is winding technology. This involves wrapping the liner in a wide variety of different orientations and with a multitude of fiber plies. For manufacturing-related and geometric reasons, the fiber material cannot be laid completely as desired. The result is thus fiber accumulations that would not be absolutely necessary in terms of the requirements. These increase the component costs and the component weight, and have an adverse effect on the requisite build space.

An alternative mode of production is the combination of various fiber application technologies. This combines, for example, braiding and winding methods. Although it is possible thereby to increase the efficiency of the fiber application, the use of multiple different fiber application methods is associated with elevated logistics expenditure and an extended process chain. This also leads to elevated testing expenditure for assurance of the quality. Unless impregnated fibers are used, there is the risk that the fibers will be moved or damaged because of the logistics processes required.

Against this background, it is an object of the disclosure to specify a way by which the manufacture of a fiber-reinforced pressure vessel can be improved. In particular, some or all of the aforementioned disadvantages are to be avoided.

The object may be achieved by a liner for a pressure vessel according to the independent claim and a pressure vessel according to a dependent claim. Further advantageous configurations will be apparent from the dependent claims and the description that follows.

A liner for a pressure vessel is specified, especially for a hydrogen tank, with a body made of a gas-tight polymer material having an outer surface in which depressions are formed. A fiber reinforcement is disposed in the depressions.

The liner serves firstly to seal the pressure vessel. The expression “gas-tight body” in this context shall be understood to mean that the permeability of the body wall for gases or fluids to be stored in the pressure vessel, preferably hydrogen, is sufficiently low, or that the body wall is impermeable to these substances. The gas-tight body acts as a barrier layer for these substances.

According to the disclosure, the liner additionally has a fiber reinforcement disposed in depressions of the outer body surface. The depressions may also be transmitted to the inside, where they appear as projections. The fiber reinforcement is preferably incorporated completely in the depressions, meaning that it does not protrude with respect to the surface of the liner that bounds the liner outside the depressions.

The liner of the disclosure may meet structural demands that are placed on the pressure vessel as well as sealing functions. Thus, it is possible to reduce the number of fiber plies in the fiber composite body that surrounds the circumference of the liner in the later pressure vessel. In this way, it is possible to dispense with process steps. The arrangement of the fiber reinforcement in depressions additionally has the advantage that the fiber reinforcement is held in place and cannot slip in the course of further processing of the liner during the process of production of the pressure vessel. This can simplify handling. In addition, the laying quality can be verified directly and with little difficulty. The risk of rejects is reduced.

The liner may be equipped with the fiber reinforcement directly in the production process. For example, the liner may be produced in an injection molding process in which the fiber reinforcement has been introduced into the injection mold beforehand. The injection molding material is then injected onto the fiber reinforcement. It is likewise possible to apply the fiber reinforcement in a process step downstream of the liner production process. For example, the liner may be produced in a blow molding process, wherein the depressions are formed by appropriate shaping of the blow mold. In a subsequent step, the fiber reinforcement is then introduced into the depressions.

It is particularly advantageous when the reinforcing fibers are deliberately laid along the directions of loading to which the liner is subjected on later use in the pressure vessel. Such an arrangement of the reinforcing fibers in conformance with the load path may be ensured in one configuration in that the depressions are already formed in the liner so as to conform with the load path. The arrangements of the depressions in the body and hence the arrangement of the fiber reinforcement may especially be in skeletal form. In other words, the fiber reinforcement may have multiple fiber strands that come into contact or cross, but in particular do not form a structure that covers a large area of the body of the liner, as would be the case for use of a weave or braid.

For example, load paths may run along the longitudinal extent of the liner. In that case, it may be advantageous in one configuration when the body is a hollow body having a body circumference and a longitudinal extent running transverse to the circumferential direction, and the depressions and the fiber reinforcement run in the direction of the longitudinal extent of the body. Of course, further orientations of the depressions and hence of the reinforcing fibers are conceivable. For example, these may run at an angle to the longitudinal extent of the liner, for example at an angle in the range from 5 to 45 degrees.

In one configuration, it is preferable that the fiber reinforcement is cohesively bonded to the body. This is the case, for example, when the liner is injected onto the fiber reinforcement. It is likewise possible, for example, to impregnate the fiber reinforcement with a matrix material before, during or after the application to the liner. The consolidated or cured matrix material then binds the fiber reinforcement to the liner.

The body of the liner is preferably formed from a thermoplastic material. The use of a thermoplastic material offers the option of resorting to manufacturing methods that enable a simple and inexpensive integration of the fiber reinforcement even during the production of the liner. Mention is made here by way of example of an injection molding method or else various spinning methods. Suitable thermoplastics are, for example, polyamide (PA) or ethylene-vinyl alcohol copolymer (EVOH).

The fiber reinforcement may include customary reinforcing fibers, for example carbon fibers, glass fibers, aramid fibers etc. The reinforcing fibers are preferably used as continuous fibers and extend, for example, across the whole length of the depression or the liner.

The reinforcing fibers can be laid with a simple laying head and programmed paths. Such load path-conforming laying methods for fiber reinforcements are known in principle to the person skilled in the art. The reinforcing fibers have preferably already been impregnated with matrix material on application, which may be consolidated or cured immediately after the application of the reinforcing fibers in the depressions.

In one configuration, it is provided that the fiber reinforcement used are unidirectional (UD) fiber tapes. UD fiber tapes are material in tape form with a thermoplastic polymer matrix into which there are embedded a multitude of reinforcing fibers arranged unidirectionally in longitudinal direction of the material in tape form. The tapes may have a thickness, for example, of a few tenths of a millimeter and frequently a width of between 5 and 25 mm. For laying of the fiber tapes, the polymer matrix thereof is heated, such that it sticks to the body of the liner on laying. This achieves immediate fixing of the fibers in the depressions.

It may be preferable that the base material of the body and of the matrix material with which the reinforcing fibers are impregnated are identical in order to achieve the best possible binding even on application of the reinforcing fibers. In this way, it is possible to transmit the force under load uniformly and without additional stress peaks.

Additionally specified is a pressure vessel, especially a hydrogen tank, with a liner as described above and a fiber reinforcement that surrounds the liner and is incorporated into a matrix material.

The liner may especially be sealed at each end by a cap (boss). The caps may be formed from plastic or metal and may, for example, provide an opening for a connection. The fiber reinforcement disposed in the depressions of the liner may extend only over the liner. This is the case particularly when the liner is already provided with the fiber reinforcement in the production of the body. It is alternatively conceivable that the fiber reinforcement disposed in the depressions of the liner body likewise extends over the caps, which for this purpose, for example, may likewise have depressions for guiding of the reinforcing fibers.

The fiber composite body surrounds the circumference of the liner (and optionally of the caps). The fiber composite body may include, for example, one or more layers of wound fibers, fiber braids and/or fiber weaves that are incorporated into a matrix material. In a preferred embodiment, the matrix material of the fiber composite body is a thermoset matrix material.

Features and details described in association with the liner are also applicable in association with the pressure vessel, and respectively vice versa, such that, with regard to the disclosure relating to the individual aspects of the invention, there is always the possibility of mutual reference.

Further advantages, features and details of the invention will be apparent from the description that follows, in which working examples of the invention are described individually with reference to the drawings. The features mentioned in the claims and in the description may each be essential to the invention here individually or in any combination. Where the word "can" or "may" is used in this application, this either means the technical possibility or the actual technical implementation.

Working examples are elucidated hereinafter with reference to the appended drawings, which are schematic representations.

DETAILED DESCRIPTION OF THE DRAWINGS

Figure 1:
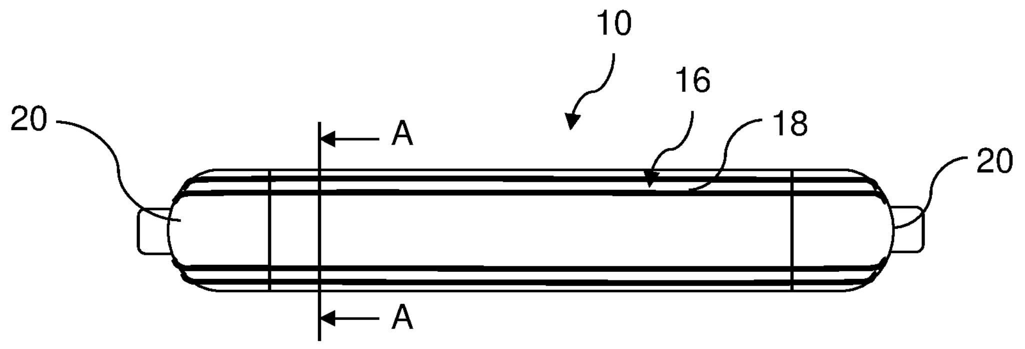
FIG. 1 an illustrative liner in an assembly with two caps.

FIG. 1 shows an illustrative liner 10 for a pressure vessel in an assembly with two caps 20 (boss). The liner 10 in association with the caps 20 ensures the integrity of the later pressure vessel 100. Connections (not shown) may be provided in the caps 20, for example for the mounting of a valve.

Figure 2:
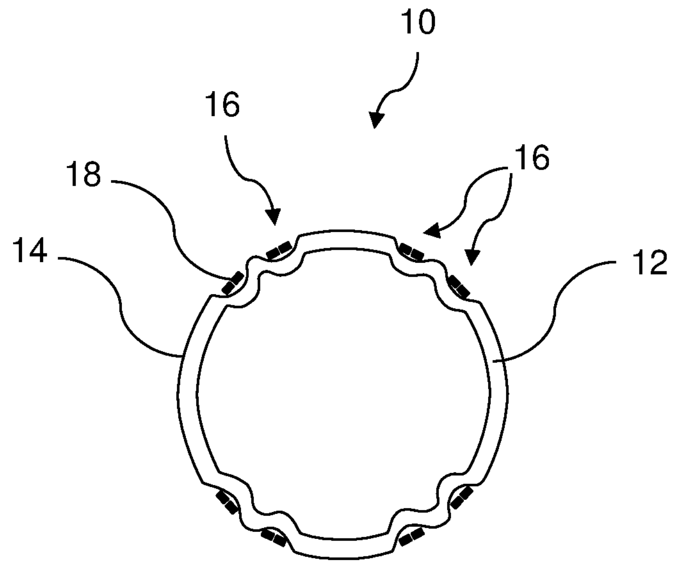
FIG. 2 a section view A-A of the liner from FIG. 1.

FIG. 2 shows a section view A-A through the liner 10 from FIG. 1. The liner 10 includes a gas-tight body 12 made of a polymer material. The body 12 may be formed from a thermoplastic material. The body 12 is a hollow body having a body circumference and a longitudinal extent that runs transverse to the circumferential direction. On the outer face 14 of the body are provided depressions 16 that extend in the direction of the longitudinal extent of the liner 10 over the entire length thereof. A fiber reinforcement 18 is disposed in the depressions 16, here in the form of pairs of two fiber strands of continuous fibers. The fiber reinforcement 18 in this example is wound around the assembly and also runs across the caps 20, which may likewise have depressions for this purpose. The fiber reinforcement 18 may be cohesively bonded to the body 12. For example, the reinforcing fibers may be impregnated with matrix material in the wrapping operation, and the matrix material may be subsequently consolidated or cured.

Figure 3:
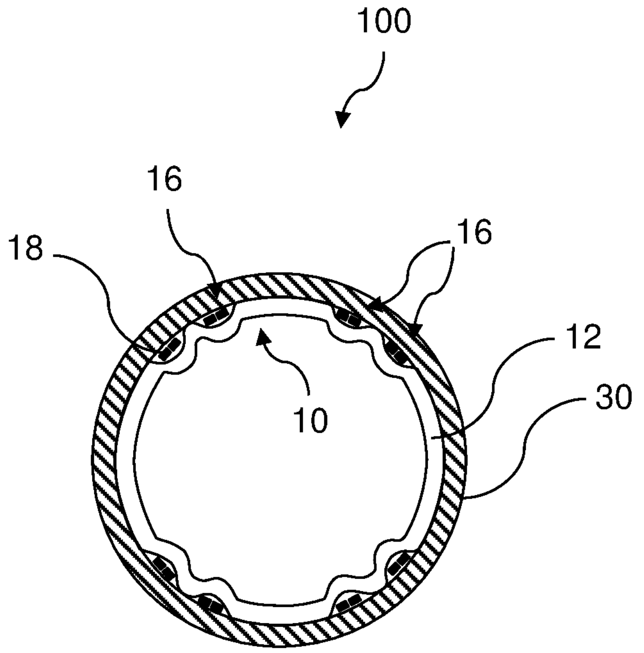
FIG. 3 a section view of an illustrative pressure vessel.

FIG. 3 shows a cross section through an illustrative pressure vessel 100 in the form of a hydrogen tank for a motor vehicle. The pressure vessel 100 includes a liner 10 according to FIGS. 1 and 2. Identical reference numerals here denote identical features and will not be described again. Around the outside of the liner 10, the pressure vessel 100 has a fiber composite body 30. The fiber composite body 30 has one or more fiber layers. The fiber layers may take the form, for example, of a winding and/or braid and may each comprise one or more identical or different fiber plies. The fiber layers are embedded in a common matrix material.

Figure 4:
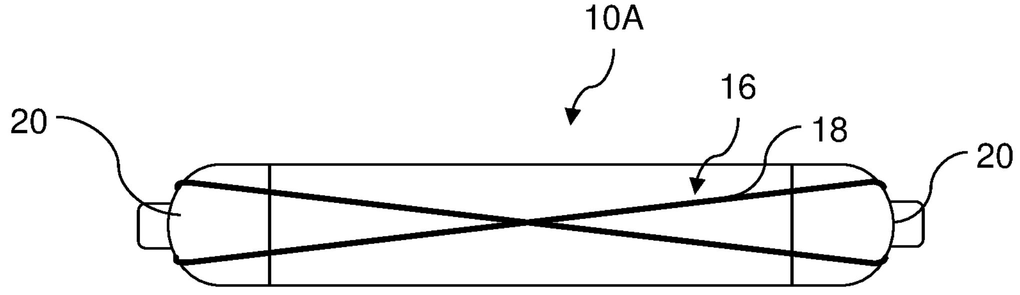
FIG. 4 a further illustrative liner in association with two caps.

FIG. 4 shows a further illustrative liner 10A in an assembly with two caps 20. In this configuration, the depressions 16 run at an angle to the longitudinal extent of the liner. For this purpose, the caps 20 preferably have corresponding depressions 16. The fiber reinforcement 18 is wound around the liner and the caps and disposed here in the depressions 16. The fiber reinforcement 18 forms a skeletal reinforcing structure.

LIST OF REFERENCE NUMERALS

10, 10A liner
12 body
14 outer face
16 depression
18 fiber reinforcement
20 cap
30 fiber composite body
100 pressure vessel

The invention claimed is:

1. A liner for a pressure vessel, the liner comprising:
a gas-tight body comprising a polymer material and having, in an outer surface thereof, depressions extending in a direction of a longitudinal extent of the gas-tight body; and
a fiber reinforcement disposed in the depressions.

2. The liner according to claim 1, wherein
the fiber reinforcement is cohesively bonded to the body.

3. The liner according to claim 1, wherein
the polymer material comprises a thermoplastic material.

4. The liner according to claim 1, wherein
the fiber reinforcement comprises unidirectional continuous fibers.

5. The liner according to claim 1, wherein
the fiber reinforcement comprises UD fiber tapes.

6. The liner according to claim 1, wherein
the depressions in the liner conform to a load path.

7. The liner according to claim 1, wherein
the gas-tight body is a hollow body having a body circumference and a longitudinal extent running transverse to the circumferential direction, and
the fiber reinforcement runs in the direction of the longitudinal extent of the body.

8. A pressure vessel comprising:
the liner according claim 1; and
a fiber composite body surrounding the liner.

9. The pressure vessel according to claim 8, wherein
a matrix material of the fiber composite body is a thermoset matrix material.

10. The liner according to claim 1, wherein the depressions are transmitted to an inner surface of the gas-tight body as projections.

11. The liner according to claim 1, wherein the depressions extend over an entire length of the gas-tight body.

12. The liner according to claim 1, wherein the fiber reinforcement is incorporated completely in the depressions, the fiber reinforcement not protruding with respect to a surface of the gas-tight body outside the depressions.

13. The liner according to claim 1, wherein the fiber reinforcement comprises carbon fibers, glass fibers and/or aramid fibers.

14. A pressure vessel comprising:
a liner comprising:
a gas-tight body comprising a polymer material and having an outer surface in which depressions are formed, the depressions being transmitted to an inner surface of the gas-tight body as projections; and
a fiber reinforcement disposed in the depressions; and
a fiber composite body surrounding the liner.

15. The pressure vessel according to claim 14, wherein
a matrix material of the fiber composite body is a thermoset matrix material.

16. A liner for a pressure vessel, the liner comprising:
a gas-tight body comprising a polymer material and having, in an outer surface thereof, depressions, the depressions being transmitted to an inner surface of the gas-tight body as projections; and
a fiber reinforcement disposed in the depressions.

* * * * *